US009452679B2

(12) United States Patent
Kikuchi et al.

(10) Patent No.: US 9,452,679 B2
(45) Date of Patent: Sep. 27, 2016

(54) OPERATION MANAGEMENT SYSTEM

(71) Applicant: HITACHI CONSTRUCTION MACHINERY CO., LTD., Tokyo (JP)

(72) Inventors: Akira Kikuchi, Tokyo (JP); Tomohiko Yasuda, Tsuchiura (JP); Takayuki Sato, Tsuchiura (JP); Hiroyuki Kobayashi, Tokyo (JP); Shinjiro Saito, Tokyo (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 16 days.

(21) Appl. No.: 14/396,513

(22) PCT Filed: Apr. 24, 2013

(86) PCT No.: PCT/JP2013/062087
§ 371 (c)(1),
(2) Date: Oct. 23, 2014

(87) PCT Pub. No.: WO2013/161882
PCT Pub. Date: Oct. 31, 2013

(65) Prior Publication Data
US 2015/0321565 A1   Nov. 12, 2015

(30) Foreign Application Priority Data

Apr. 26, 2012   (JP) ................................. 2012-101370

(51) Int. Cl.
*B60L 9/00*   (2006.01)
*B60K 6/34*   (2007.10)
(Continued)

(52) U.S. Cl.
CPC . *B60L 3/00* (2013.01); *B60K 6/34* (2013.01); *B60K 6/46* (2013.01); *B60L 9/00* (2013.01);
(Continued)

(58) Field of Classification Search
CPC .......... B60L 5/04; B60L 9/00; B60L 3/0023; H01B 1/22; H02J 7/00
USPC ....... 701/22; 180/65.21; 320/167; 105/26.05
See application file for complete search history.

(56) References Cited

U.S. PATENT DOCUMENTS

2004/0216636 A1* 11/2004 Emori ...................... B60L 9/18
                                                                        105/26.05
2004/0225435 A1* 11/2004 Ogawa .................... B60K 6/46
                                                                        701/532
(Continued)

FOREIGN PATENT DOCUMENTS

JP   2004-312953 A   11/2004
JP   2006-296182 A   10/2006
(Continued)

*Primary Examiner* — Thomas G Black
*Assistant Examiner* — Wae Louie
(74) *Attorney, Agent, or Firm* — Mattingly & Malur, PC

(57) ABSTRACT

An operation management system obviates such a situation that a power substation would trip and a supply of power to overhead wires would stop. The operation management system controls operation of electric drive vehicles, each of which is provided with a trolley mode, in which the electric drive vehicle runs by power supplied to the overhead wires, and a diesel mode, in which the electric drive vehicle runs by an output from an engine. A supply margin detection unit detects a current supply margin of power and a running position detecting unit detects a current running position of the electric drive vehicle. A running mode detection unit detects a current running mode of the electric drive vehicle and a running mode determination unit determines a next running mode based on the detection results of the supply margin detection unit, running position detecting unit, and running mode detection unit.

4 Claims, 9 Drawing Sheets

(51) Int. Cl.
  *B60L 3/00* (2006.01)
  *B60L 11/18* (2006.01)
  *B60K 6/46* (2007.10)
  *B60L 11/12* (2006.01)
  *B60L 13/00* (2006.01)
  *B60W 10/06* (2006.01)
  *B60W 10/08* (2006.01)
  *B60W 20/00* (2016.01)
  *B60L 5/04* (2006.01)
  *H01B 1/22* (2006.01)
  *H02J 7/00* (2006.01)
  *B60M 3/00* (2006.01)

(52) U.S. Cl.
  CPC ............ *B60L 11/12* (2013.01); *B60L 11/1842* (2013.01); *B60L 13/00* (2013.01); *B60W 10/06* (2013.01); *B60W 10/08* (2013.01); *B60W 20/00* (2013.01); *B60L 5/04* (2013.01); *B60M 3/00* (2013.01); *B60Y 2400/212* (2013.01); *H01B 1/22* (2013.01); *H02J 7/00* (2013.01); *Y02E 60/721* (2013.01); *Y02T 10/7005* (2013.01); *Y02T 10/7072* (2013.01); *Y02T 90/121* (2013.01); *Y02T 90/128* (2013.01); *Y02T 90/14* (2013.01); *Y02T 90/163* (2013.01); *Y04S 10/126* (2013.01)

(56) References Cited

U.S. PATENT DOCUMENTS

| | | | |
|---|---|---|---|
| 2006/0071862 A1* | 4/2006 | Aisenbrey | H01B 1/22 343/700 MS |
| 2010/0270983 A1* | 10/2010 | Gong | B60L 3/0046 320/167 |
| 2013/0018766 A1* | 1/2013 | Christman | B60L 3/0023 705/34 |
| 2013/0245876 A1* | 9/2013 | Messerschmidt | B60L 5/045 701/22 |

FOREIGN PATENT DOCUMENTS

| | | |
|---|---|---|
| JP | 2008-024206 A | 2/2008 |
| JP | 2010-254150 A | 11/2010 |

\* cited by examiner

OPERATION MANAGEMENT SYSTEM

TECHNICAL FIELD

This invention relates to an operation management system for electric drive vehicles, each of which is switchable between running using power supplied from overhead wires and running by an engine output.

BACKGROUND ART

As represented by trolley buses, there have been proposed current-collecting electric drive vehicles, each of which runs using power supplied from overhead wires in an area equipped with the overhead wires but runs by drive power from an internal combustion engine in an area equipped with no overhead wires (see Patent Document 1).

On the other hand, such current-collecting dump trucks are also used as dump trucks that haul ores dug by excavators at a mine. In an area equipped with overhead wires, each dump truck (electric drive vehicle) of this type runs by driving an electric motor with power supplied from the overhead wires, but in an area equipped with no overhead wires, runs by driving a generator with an engine (for example, diesel engine) and driving the electric motor with power generated by the generator. Hereinafter, the mode in which running is performed using power supplied from overhead wires will be called "the trolley mode", while the mode in which running is performed by driving a generator with an engine and using power generated by the generator will be called "the diesel mode". In general, the trolley mode is high in running speed and can increase the transport volume, because the power to be supplied to an electric motor is greater in the trolley mode than in the diesel mode. Further, the trolley mode is lower in fuel consumption compared with the diesel mode because the trolley mode needs no engine output. In a mine, a plurality of such dump truck are running while switching the trolley mode and the diesel mode depending on the running area.

PRIOR ART DOCUMENT

Patent Document

Patent Document 1: JP-A-2010-254150

DISCLOSURE OF THE INVENTION

Problem to be Solved by the Invention

If a plurality of such dump trucks run, however, these dump trucks come in and out of an area equipped with overhead wires so that the number of those connected to the overhead wires varies, leading to significant variations in the power required for the overhead wires. If many of the dump trucks are connected to the overhead wires and power in excess of the power supplying capability of the overhead wires is required to the overhead wires, a problem arises such that a power station and/or a substation, which supplies power to the overhead wires, may trip. Even if only a few ones of the dump trucks are connected to the overhead wires, a similar problem arises if the power station and/or substation is lowered in power supplying capability for a certain cause. The occurrence of such tripping of the power station and/or substation lowers the operating rate of the dump trucks so that the transport volume of ores decreases. This decrease of the transport volume of ores also leads to a reduction in the profits of the mine. It is, accordingly, important to avoid such lowering of the operating rate of the dump trucks.

To increase the transport volume of ores, on the other hand, it is desired to run in the trolley mode as much as possible. In addition, the running in the trolley mode is also desired from the viewpoint of fuel consumption. However, the more the number of dump trucks that run in the trolley mode, the higher the risk that the power plant and/or substation may trip.

A first object of the present invention is to obviate such a situation that a power plant and/or a substation would trip and a supply of power to overhead wires would stop. A second object of the present invention is to suppress the lowering of the operating rate of dump trucks, and at the same time, to ensure increasing the transport volume of the dump trucks and lowering the fuel consumption of the dump trucks. A third object of the present invention is to make as many dump trucks as possible run in the trolley mode.

Means for Solving the Problem

To achieve the above-described objects, an operation management system according to the present invention is an operation management system for managing operation of electric drive vehicles, each of which is provided with two running modes, one being a trolley mode in which the electric drive vehicle runs by power supplied to overhead wires from a power plant or a substation, the other being a diesel mode in which the electric drive vehicle runs by an output from an engine, and is characterized by comprising a data reception unit for receiving a first data on a supply margin of power as transmitted from at least one of the power plant and the substation, a second data on a running position as transmitted from each electric drive vehicle, and a third data on a running mode as transmitted from each electric drive vehicle, a supply margin detection unit for detecting a current supply margin based on the first data, a running position detecting unit for detecting a current running position of the electric drive vehicle based on the second data, a running mode detection unit for detecting a current running mode of the electric drive vehicle based on the third data, a running mode determination unit for determining a next running mode of the electric drive vehicle based on detection results by the supply margin detection unit, running position detecting unit, and running mode detection unit, and a running mode instruction unit for instructing the running mode, which has been determined by the running mode determination unit, to the electric drive vehicle.

According to the present invention, the operation of the electric drive vehicles is managed based on the supply margin of power and the running position and running mode of each electric drive vehicle, so that the electric drive vehicles are not operated in the trolley mode in excess of power that the power station and/or substation can supply. It is, therefore, possible to avoid such an unexpected situation that the power station and/or substation would trip suddenly and would become no longer possible to supply power to the overhead wires. According to the present invention, the power station and/or substation can be prevented from tripping, thereby making it also possible to avoid sudden lowering of the power station and/or substation and to ensure an increase of the transport volume by the electric drive vehicles. Moreover, the present invention is of the configuration that the next running mode of each electric drive vehicle is determined to be either the trolley mode or the diesel mode by the supply margin of power and the running position and running mode of the electric drive vehicle, and therefore, can ensure lowering the fuel consumption of the electric drive vehicles and making as many electric drive vehicles as possible run in the trolley mode.

The operation management system according to the present invention may preferably include the following configurations.

If the running position of the electric drive vehicle as detected by the running position detecting unit is outside an area of the overhead wires, the running mode determination unit determines the diesel mode as the next running mode of the electric drive vehicle the running position of which is outside of the area of the overhead wires, and the running mode instruction unit instructs the electric drive vehicle to switch the running mode to the diesel mode.

If the supply margin as detected by the supply margin detection unit is smaller than a predetermined value and the running position of the electric drive vehicle as detected by the running position detection unit is a position where the electric drive vehicle enters the area of the overhead wires, the running mode determination unit determines the diesel mode as the next running mode of the electric drive vehicle the running position of which is in the position where the electric drive vehicle enters the area of the overhead wires, and the running mode instruction unit instructs the electric drive vehicle to switch the running mode to the diesel mode. When configured as described above, it is possible to more certainly avoid tripping of the power station and/or substation.

If the supply margin as detected by the supply margin detection unit is not smaller than a predetermined value, the running position of the electric drive vehicle as detected by the running position detection unit is inside the area of the overhead wires and the running mode as detected by the running mode detection unit with respect to the electric drive vehicle the running position of which is inside the area of the overhead wires is the diesel mode, the running mode determination unit determines the trolley mode as the next running mode of the electric drive vehicle the running position of which is in the area of the overhead wires and the running mode of which is the diesel mode, and the running mode instruction unit instructs the electric drive vehicle to switch the running mode to the trolley mode. When configured as described above, it is possible to ensure further lowering the fuel consumption of the electric drive vehicles and making as many electric drive vehicles as possible run in the trolley mode.

In this configuration, it is more preferred to configure that, if plural ones of the electric drive vehicles, the running position of each of said plural electric drive vehicles being in the area of the overhead wires and the running mode of each of said plural electric drive vehicles being the diesel mode, exist, the running mode instruction unit instructs, based on the running positions as detected by the running position detection unit, to switch the running mode to the trolley mode in turn from the vehicle running at a head of the plural electric drive vehicles. The electric drive vehicles are faster when running in the trolley mode than when running in the diesel mode. If the running mode of one of the electric drive vehicles, said one electric drive vehicle running in rear of the electric drive vehicle running at the head, were switched to the trolley mode first, the electric drive vehicle which is running in the diesel mode at the head would interfere with the running of the rear electric drive vehicle that has been switched to the trolley mode.

If the supply margin as detected by the supply margin detection unit is smaller than a predetermined value, the running position of the electric drive vehicle as detected by the running position detection unit is inside the area of the overhead wires and the running mode as detected by the running mode detection unit with respect to the electric drive vehicle the running position of which is inside the area of the overhead wires is the trolley mode, the running mode determination unit determines the diesel mode as the next running mode of the electric drive vehicle the running position of which is in the area of the overhead wires and the running mode of which is the trolley mode, and the running mode instruction unit instructs the electric drive vehicle to switch the running mode to the diesel mode. When configured as described above, it is possible to more certainly avoid tripping of the power station and/or substation.

In this configuration, it is more preferred to configure that, if plural ones of the electric drive vehicles, the running position of each of said plural electric drive vehicles being in the area of the overhead wires and the running mode of each of said plural electric drive vehicles being the trolley mode, exist, the running mode instruction unit instructs, based on the running positions as detected by the running position detection unit, to switch the running mode to the diesel mode in turn from the vehicle running at a tail of the plural electric drive vehicles. If the running mode of one of the electric drive vehicles, said one electric drive vehicle running in front of the electric drive vehicle running at the tail, were switched to the diesel mode first, the electric drive vehicle which has been switched to the diesel mode would interfere with the running of the rear electric drive vehicle or vehicles that is or are running in the trolley mode.

Also to achieve the above-described objects, another operation management system according to the present invention is a managing operation of electric drive vehicles, each of which is provided with two running modes, one being a trolley mode in which the electric drive vehicle runs by driving an electric motor with power supplied to overhead wires from a power plant or a substation, the other being a diesel mode in which the electric drive vehicle runs by driving the electric motors with an output from an engine, and is characterized by comprising a data reception unit for receiving a first data on a supply margin of power as transmitted from at least one of the power plant and the substation, and a second data on a running position as transmitted from each electric drive vehicle, a supply margin detection unit for detecting a current supply margin based on the first data, a running position detecting unit for detecting a current running position of the electric drive vehicle based on the second data, a running mode determination unit for determining a next running mode of the electric drive vehicle based on a detection result by the running position detecting unit, a running mode instruction unit for instructing the running mode, which has been determined by the running mode determination unit, to the electric drive vehicle, an electric motor output determination unit for determining an output command to the electric motor based on detection results of the supply margin detection unit and running position detection unit, and an electric motor output instruction unit for instructing the output command, which has been determined by the electric motor output determination unit, to the electric drive vehicle.

According to the present invention, the operation of the electric drive vehicles is managed based on the supply margin of power and the running position of each electric drive vehicle, so that the electric drive vehicles are not operated in the trolley mode in excess of power that the power station and/or substation can supply. It is, therefore, possible to avoid such an unexpected situation that the power station and/or substation would trip suddenly and would become no longer possible to supply power to the overhead wires. According to the present invention, the power station and/or substation can be prevented from tripping, thereby making it also possible to avoid sudden lowering of the operating rates of the electric drive vehicles.

Advantageous Effects of the Invention

According to the present invention, it is possible to prevent the tripping of a power plant and/or station and to suppress the lowering of the operating rate of electric drive vehicles, and at the same time, also to make as many electric drive vehicles as possible run in the trolley mode. It is, therefore, possible to ensure increasing the transport volume of the electric drive vehicles and lowering the fuel consumption of the electric drive vehicles.

MODES FOR CARRYING OUT THE INVENTION

With reference to the drawings, a description will hereinafter be made about operation management systems according to embodiments of the present invention. In these embodiments, descriptions will be made about systems each of which controls operation of dump trucks as examples of electric drive vehicles. About the configuration and running operation of each dump truck, a description will hence be made first with reference to FIG. 1.

Figure 1:
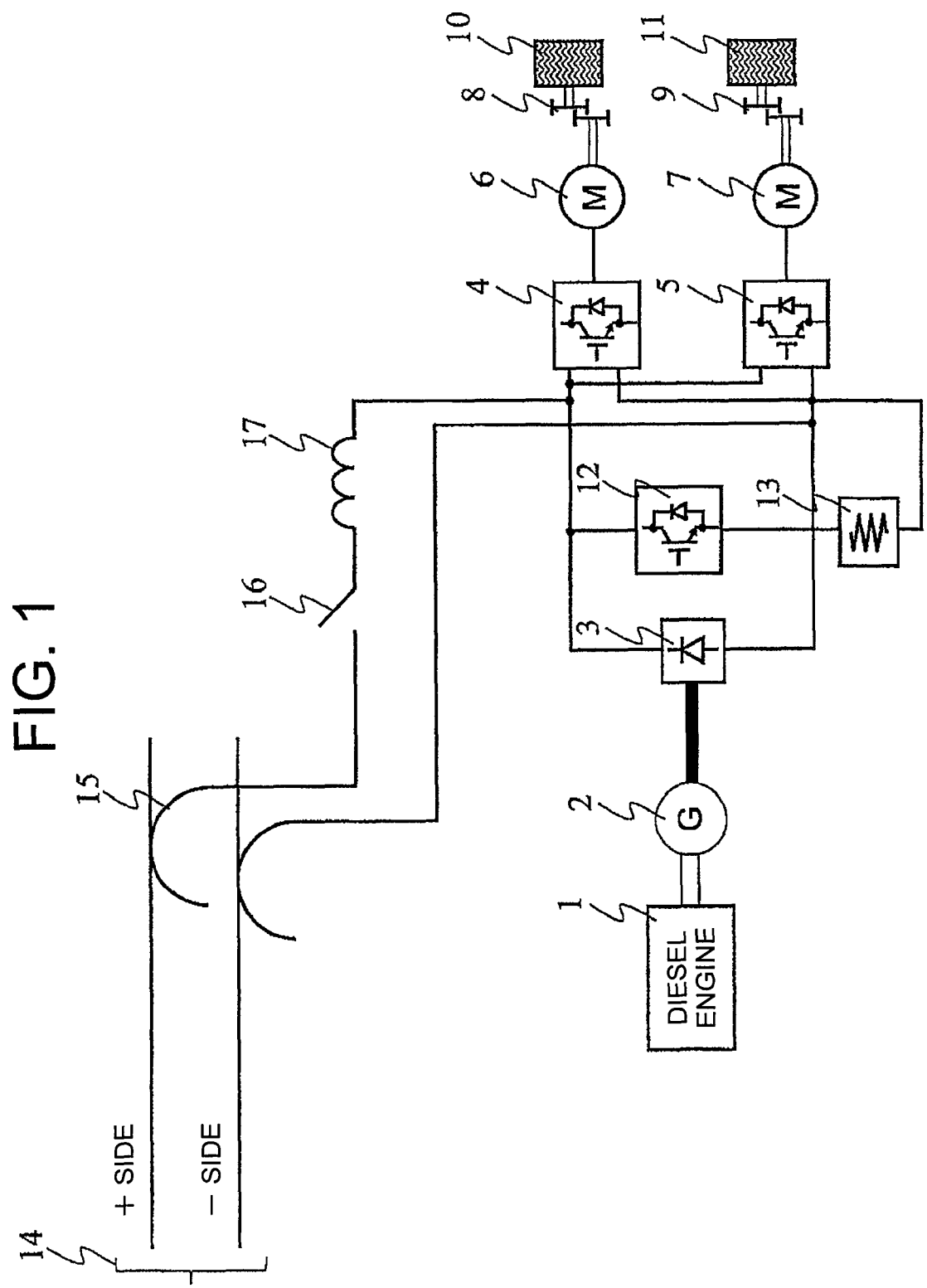
FIG. 1 is a configuration diagram of a dump truck as one example of an electric drive vehicle to which the present invention has been applied.

FIG. 1 is a configuration diagram of the dump truck. The dump truck to which this embodiment is applied is provided, as shown in FIG. 1, with a diesel engine 1, a generator 2, a rectifier 3, inverters 4,5, electric motors 6,7, reduction gears 8,9, wheels 10,11, a chopper 12, a regenerative resistor 13, pantographs 15, a magnetic connector 16, and a reactor 17.

This dump truck can run in two modes, one being a diesel mode, and the other a trolley mode. Now, a description will first be made of operation when the dump truck runs in the diesel mode. In the diesel mode, the diesel engine 1 drives the generator 2, and the generator 2 outputs three-phase AC power. The rectifier 3 rectifies the three-phase AC power, which has been outputted by the generator 2, into DC power, and supplies the DC power to the inverter 4 and inverter 5. The inverter 4 converts the DC current, which has been supplied from the rectifier 3, to AC power of variable frequency, and supplies it to the electric motor 6 to drive the electric motor 6. The inverter 5 converts the DC current, which has been supplied from the rectifier 3, to AC power of variable frequency, and supplies it to the electric motor 7 to drive the electric motor 7. The electric motor 6 is connected to the wheel 10 via the reduction gear 8, so that the wheel 10 rotates when the electric motor 6 is driven by the inverter 4. The electric motor 7 is connected to the wheel 11 via the reduction gear 9, so that the wheel 11 rotates when the electric motor 7 is driven by the inverter 5. The wheel 10 is arranged on a left side of a body of the dump truck, while the wheel 11 is arranged on a right side of the body of the dump truck. The dump truck accelerates when the wheel 10 and wheel 11 rotate.

Upon deceleration of the dump truck, on the other hand, the electric motor 6 and electric motor 7 operate as generators, so that the kinetic energy of the dump truck is converted to electric energy and power is regenerated in a DC circuit of the inverter 4 and inverter 5. To absorb the regenerative power regenerated at this time, the regenerative resistor 13 is connected to the DC circuit of the inverter 4 and inverter 5 via the chopper 12. When the DC voltage of the DC circuit of the inverter 4 and inverter 5 exceeds a specified value, the chopper 12 is actuated to consume the regenerated power at the regenerative resistor 13.

A description will next be made of operation upon running in the trolley mode. The overhead wires 14 are connected to the DC circuit of the inverter 4 and inverter 5 via the pantographs 15, magnetic connector 16 and reactor 17. When the magnetic connector 16 is turned on, DC power is supplied from the side of the overhead wires 14 to the inverter 4 and inverter 5. The inverter 4 converts the DC power, which has been supplied from the side of the overhead wires 14, to AC power of variable frequency, and supplies it to the electric motor 6 to drive the electric motor 7. The inverter 5 converts the DC power, which has been supplied from the side of the overhead wires 14, to AC power of variable frequency, and supplies it to the electric motor 7 to drive the electric motor 7. As in the diesel mode, the electric motor 6 is driven by the inverter 4 and the electric motor 7 is driven by the inverter 5, whereby the wheel 10 and wheel 11 rotate and the dump truck accelerates.

Upon deceleration of the dump truck, on the other hand, the electric motor 6 and electric motor 7 operate as generators as in the diesel mode, so that the kinetic energy of the dump truck is converted to electric energy and power is regenerated in the DC circuit of the inverter 4 and inverter 5. When the DC voltage of the DC circuit of the inverter 4 and inverter 5 exceeds the specified value, the chopper 12 is actuated to consume the regenerated power at the regenerative resistor 13.

As described above, in the diesel mode, the dump truck runs by driving the generator 2 with the diesel engine 1 and driving the electric motors 6,7 with power generated by the generator 2, and in the trolley mode, the dump truck runs by driving the electric motors 6,7 with power supplied from the overhead wires 14.

Figure 2:
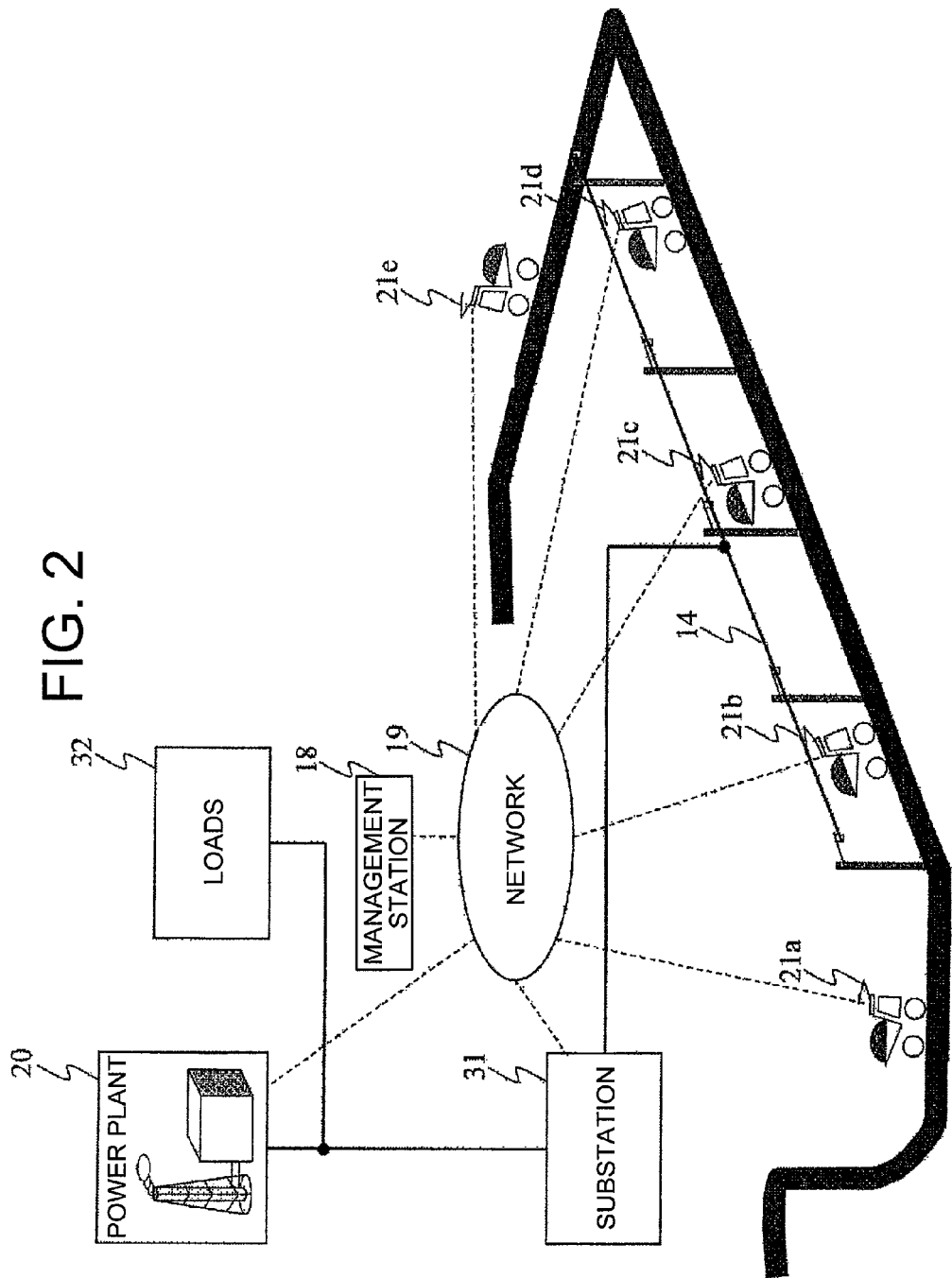
FIG. 2 is an overall configuration diagram of a mine to which the present invention has been applied.

FIG. 2 shows the configuration diagram of an entire mine. A power plant 20 supplies AC power to a substation 31 and loads 32. The substation 31 lowers the voltage of the supplied AC power by a transformer, and subsequent to rectification by a rectifier, supplies DC power to the overhead wires 14. A management station 18, which performs management of the mine, communicates, via a communication network 19 such as a wireless network, with the power plant 20 that supplies AC current to the substation 31, the substation 31 that supplies DC current to the overhead wires 14, and dump trucks 21a, 21b, 21c, 21d, 21e. It is to be noted that any number of trucks can be included although the five dump truck are included in this embodiment. The power plant 20 and substation 31 each detect the margin of supplying power to the overhead wires 14, and transmit it as a supply margin to the management station 18 via the communication network 19. Here, the term "supply margin" means an index that indicates how much power the power plant 20 or substation 31 would be able to supply further.

The supply margin of the power station 20 indicates the percentage of power, which the power plant 20 can further supply to the substation 31, relative to the rated output of the power plant 20. Assuming that the rated output of the power plant 20 is W1 and the current output of the power plant 20 is W2, the supply margin (%) of the power plant 20 can then be determined by $(1-W2/W1)\times 100$. If the power plant 20 is outputting power as much as 90% of the rated output, for example, the supply margin is 10%. Now assume that the power plant 20 becomes difficult to perform rated operation for a certain cause and can output, for example, only 50% of the rated output at the maximum. If the power plant 20 is outputting power as little as 40% of the rated output, the supply margin is also 10%.

The supply margin of the substation 31 indicates the percentage of power, which the substation 31 can further supply to the overhead wires 14, relative to the rated output of the substation 31. Assuming that the rated output of the substation 31 is W3 and the current output of the substation 31 is W4, the supply margin (%) of the substation 31 can then be determined by $(1-W4/W3)\times 100$. If the substation 31 is outputting power as much as 90% of the rated output, for example, the supply margin is 10%. As an alternative, the supply margin of the substation 31 may be an index that indicates how much current the substation 31 can supply further. Now assuming that the rated current of the substation 31 is I3 and the current of the substation 31 at present is I4, the supply margin (%) of the substation 31 can then be determined by $(1-I4/I3)\times 100$. If the substation 31 is outputting current as much as 90% of the rated current, the supply margin is 10%.

It is to be noted that, by comparing an index that indicates how much power the substation 31 can supply further with another index that indicates how much current the substation 31 can supply further, the index of a smaller value may be used as the supply margin of the substation 31. If the substation 31 is outputting power as much as 90% of its rated output and is outputting current as much as 95% of its rated current, for example, the supply margin is then 5%. If the substation 31 is outputting power as much as 90% of its rated output and is outputting current as much as 85% of its rated current, on the other hand, the supply margin is then 10%.

The dump trucks 21a, 21b, 21c, 21d, 21e are provided with GPS receivers, respectively. These GPS receivers measure the running positions of the individual dump trucks, and transmit the thus-measured running positions to the management station 18 via the communication network 19. Further, the dump trucks 21a, 21b, 21c, 21d, 21e also transmit the current running modes of the individual dump trucks, that is, whether the individual dump trucks are running in the diesel mode or are running in the trolley mode, to the management station 18 via the communication network 19.

The management station 18 determines the next running mode commands of the individual dump trucks from the supply margin of the power plant 20, the supply margin of the substation 31, and the running positions and running modes of the dump trucks 21a, 21b, 21c, 21d, 21e, and transmit the running mode commands to the dump trucks 21a, 21b, 21c, 21d, 21e via the communication network 19. If the transmitted running mode commands are different from the current running modes, the dump trucks 21a, 21b, 21c, 21d, 21e switch the running modes in accordance with the running mode commands.

Figure 3:
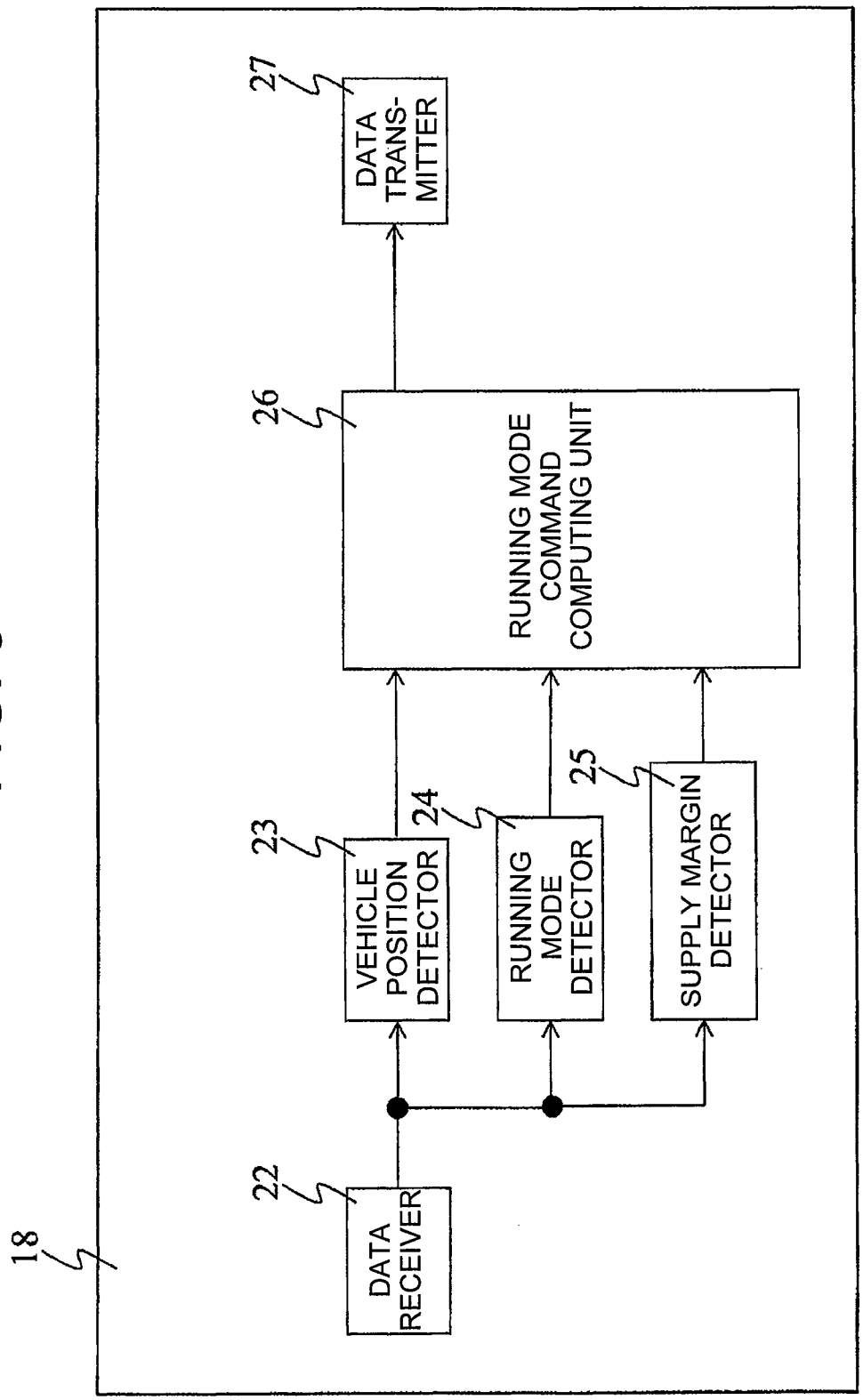
FIG. 3 is a configuration diagram of an operation management system according to a first embodiment of the present invention.

FIG. 3 shows the configuration of the operation management system according to the first embodiment. As shown in FIG. 3, the operation management system according to the first embodiment is provided with a data receiver (data reception unit) 22, a vehicle position detector (vehicle position detecting unit) 23, a running mode detector (running mode detection unit) 24, a supply margin detector (supply margin detection unit) 25, a running mode command computing unit (running mode determination unit) 26, and a data transmitter (running mode instruction unit) 27. This operation control system is installed in the management station 18, receives various data transmitted from the power plant 20, substation 31 and dump trucks 21a-21e to the management station 18 via the communication network 19, and manages the operation of the dump trucks 21a-21e based on these received data. A description will hereinafter be made in detail as to how the management station 18 is managing the operation of the dump trucks.

The data receiver 22 receives, via the communication network 19, first data on the supply margins of the power plant 20 and substation 31, second data on the running positions of the individual dump trucks, and third data on the running modes of the individual dump trucks. The vehicle position detector 23 detects, from the second data, the running positions of the individual dump trucks. The running mode detector 24 detects, from the third data, the running modes of the individual dump trucks. The supply margin detector 25 detects, from the first data, the supply margins of the power plant 20 and substation 31. Using, as inputs, the running positions of the individual dump trucks as outputted from the vehicle position detector 23, the running modes of the individual dump trucks as outputted from the running mode detector 24, and the supply margins of the power plant 20 and substation 31 as outputted from the supply margin detector 25, the running mode command computing unit 26 outputs running mode commands to the individual dump trucks. Using, as inputs, the running mode commands outputted from the running mode command computing unit 26, the data transmitter 27 transmits the running mode commands to the individual dump trucks via the communication network 19.

Figure 4:
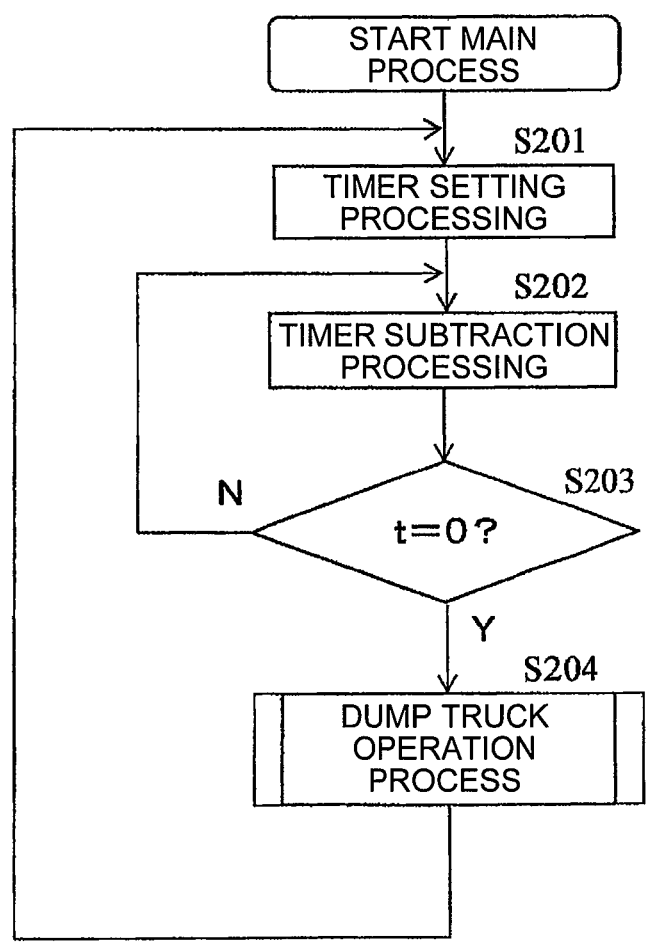
FIG. 4 is a flow chart illustrating the procedure of a main process to be executed by the operation management system according to the first embodiment.

A description will next be made about the procedure of processing by the operation management system according to the first embodiment. FIG. 4 is a flow chart of a main process by the operation management system according to the first embodiment. As illustrated in FIG. 4, when the main process is started, timer setting processing is performed in S201. A time t to be set in S201 is, for example, 3 minutes.

It is to be noted that this time t can be determined as desired depending on a determination value A (to be described subsequently herein) for the supply margins, the number of the dump trucks, and the like. In S202, timer subtraction processing is next performed.

In S203, a determination is next made as to whether or not t=0. If "Yes" in S203, an operation process of the dump trucks, said operation process being to be described next, is performed. When the operation process of the dump trucks is performed once, the process then returns again to before S201, and the processing of S201 to S204 is repeated. It is to be noted that, if "No" in S203, the process returns to before S202, and timer subtraction processing is repeated until t=0. As is apparent from this FIG. 4, the dump truck operation process is started periodically at a timing of once every three minutes.

Figure 5:
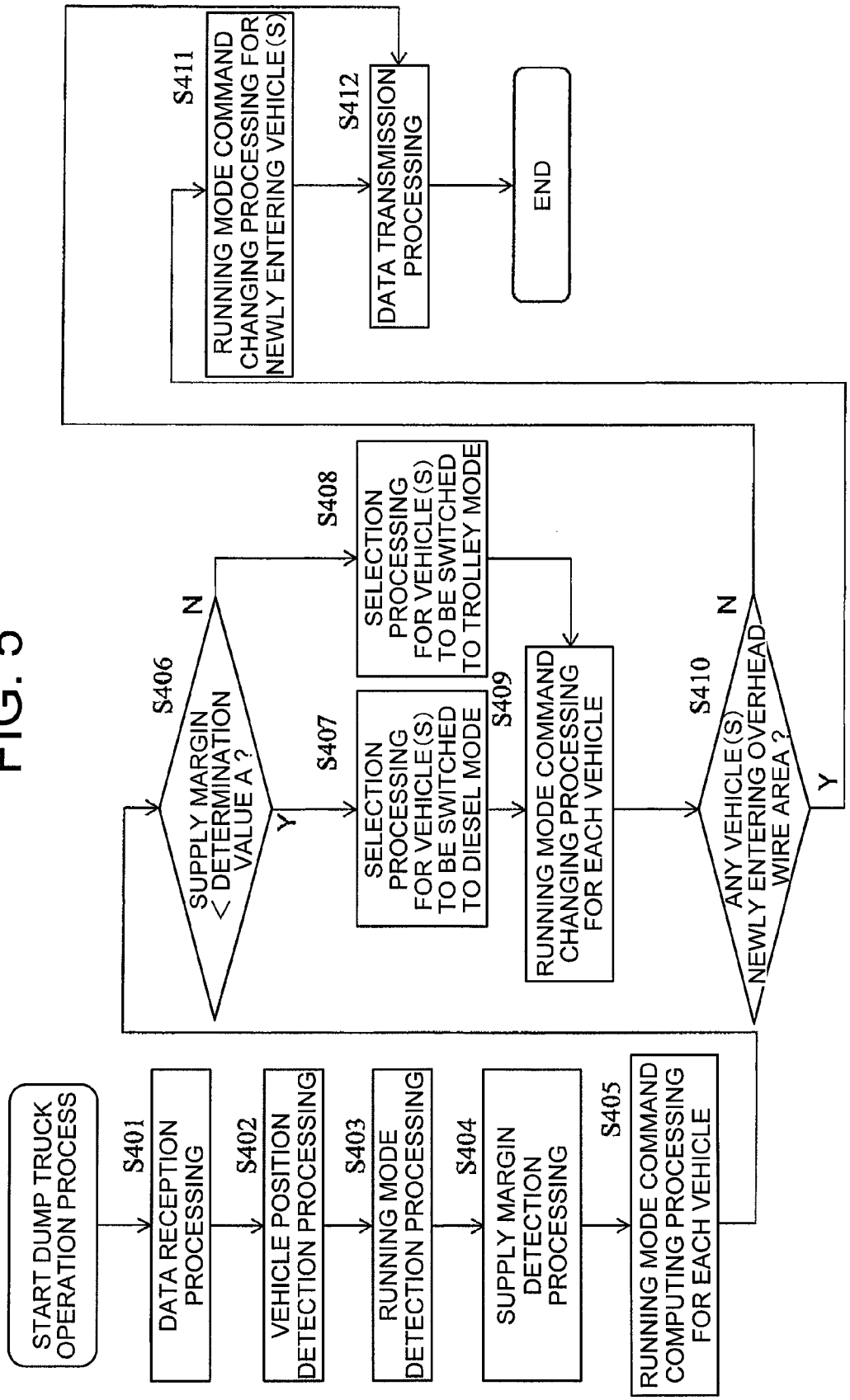
FIG. 5 is a flow chart depicting the procedure of the dump truck operation process illustrated in FIG. 4.

A description will next be made about details of the dump truck operation process. FIG. 5 is a flow chart of the operation process of the dump trucks. In S401, the data receiver 22 receives first data on the supply margins of the power plant 20 and substation 31, second data on the running positions of the individual dump trucks, and third data on the running modes of the individual dump trucks. After execution of S401, the process moves to S402. In S402, the vehicle position detector 23 detects the running positions of the individual dump trucks from the second data. After execution of S402, the process moves to S403.

In S403, the running mode detector 24 detects the running modes of the individual dump trucks from the third data. After execution of S403, the process moves to S404. In S404, the supply margin detector 25 detects the supply margins of the power plant 20 and substation 31 from the first data. After execution of S404, the process moves to S405.

In S405, running mode commands for the individual dump trucks are computed from the running positions of the individual dump trucks. Described specifically, a command of running in the trolley mode is computed for each dump truck existing in the overhead wire area, and a command of running in the diesel mode is computed for each dump truck existing in the non-overhead wire area. After execution of S405, the process moves to S406.

In S406, the supply margins of the power plant 20 and substation 31 are compared with the determination value (predetermined value) A. If either one of the supply margins is smaller than the determination value A, the process moves to S407, or otherwise moves to S408. It is to be noted that the determination value to be compared with the supply margin of the power plant 20 and the determination value to be compared with the supply margin of the substation 31 may be set individually.

In S407, processing is performed to select each dump truck, which is running in the trolley mode and is to be switched to the diesel mode, such that the supply margins of the power plant 20 and substation 31 become equal to or greater than the determination value A. Here, the dump trucks to be switched to the diesel mode are selected in turn from the dump truck running at a tail out of the dump trucks running in the trolley mode. This is to prevent each dump truck, which will run in the diesel mode, from interfering with the running of any dump truck running in the trolley mode, because the dump trucks are faster when running in the trolley mode than when running in the diesel mode. After execution of S407, the process moves to S409.

In S408, processing is performed to select each dump truck, which is running in the diesel mode and is to be switched to the trolley mode, to an extent that the supply margins of the power plant 20 and substation 31 satisfy the relationship of being equal to or greater than the determination value A. Here, the dump trucks to be switched to the trolley mode are selected in turn from the dump truck running at a head out of the dump trucks running in the diesel mode in the overhead wire area. This is to prevent each dump truck, which will run in the diesel mode, from interfering with the running of any dump truck running in the trolley mode, because the dump trucks are faster when running in the trolley mode than when running in the diesel mode. After execution of S408, the process moves to S409.

In S409, based on the running mode command for each individual dump truck as computed in S405, computation is performed to change the running mode command such that for the dump truck selected in S407, it becomes a running mode command in the diesel mode but for the dump truck selected in S408, it becomes a running mode command in the trolley mode. After execution of S409, the process moves to S410.

In S410, it is determined whether or not there is any dump truck which is newly entering the overhead wire area and which is before being switched from the diesel mode to the trolley mode. The process moves to S411 if "Yes", but to S412 if "No".

In S411, if the supply margin of the power plant 20 or substation 31 becomes smaller than the determination value A upon switching of the dump truck, which is newly entering the overhead wire area, from the diesel mode to the trolley mode, computation is performed to change the running mode command such that the diesel mode will be continued without effecting the switching from the diesel mode to the trolley mode. After execution of S411, the process moves to S412.

In S412, the data transmitter 27 transmits the running mode command to each dump truck. Upon execution of S412, the series of processing ends.

The determination value A is set in consideration of output variations of the power plant 20 and variations in the power to be consumed by the loads 32. Assuming, for example, that output variations of the power plant 20 are ±10% relative to the rated output of the power plant 20 and variations of the power consumed by the loads 32 are ±10%, the power that can be supplied to the overhead wires 14 may decrease by 20% if, transiently, the output of the power plant 20 decreases by 10% and the power consumed by the loads 32 increases by 10%. Therefore, the determination value A is set, for example, at 20%. By setting as described above, the overhead wires 14 no longer require any power in excess of the supply capability of the power plant 20, thereby making it possible to avoid tripping of the power plant 20.

By adopting such a flow chart as described above, the supply margins of the power plant 20 and substation 31 can be maintained equal to or greater than the determination value A. As a consequence, it is possible to avoid tripping of the power plant 20 and/or substation 31, and hence, to avoid lowering of the operating rates of the dump trucks. As the number of dump trucks running in the trolley mode increases to an extent that the supply margins of the power plant 20 and substation 31 remain equal to or greater than the determination value A, it is possible to assure an increase in the transport volume of ores and a reduction in fuel consumption.

Figure 6:
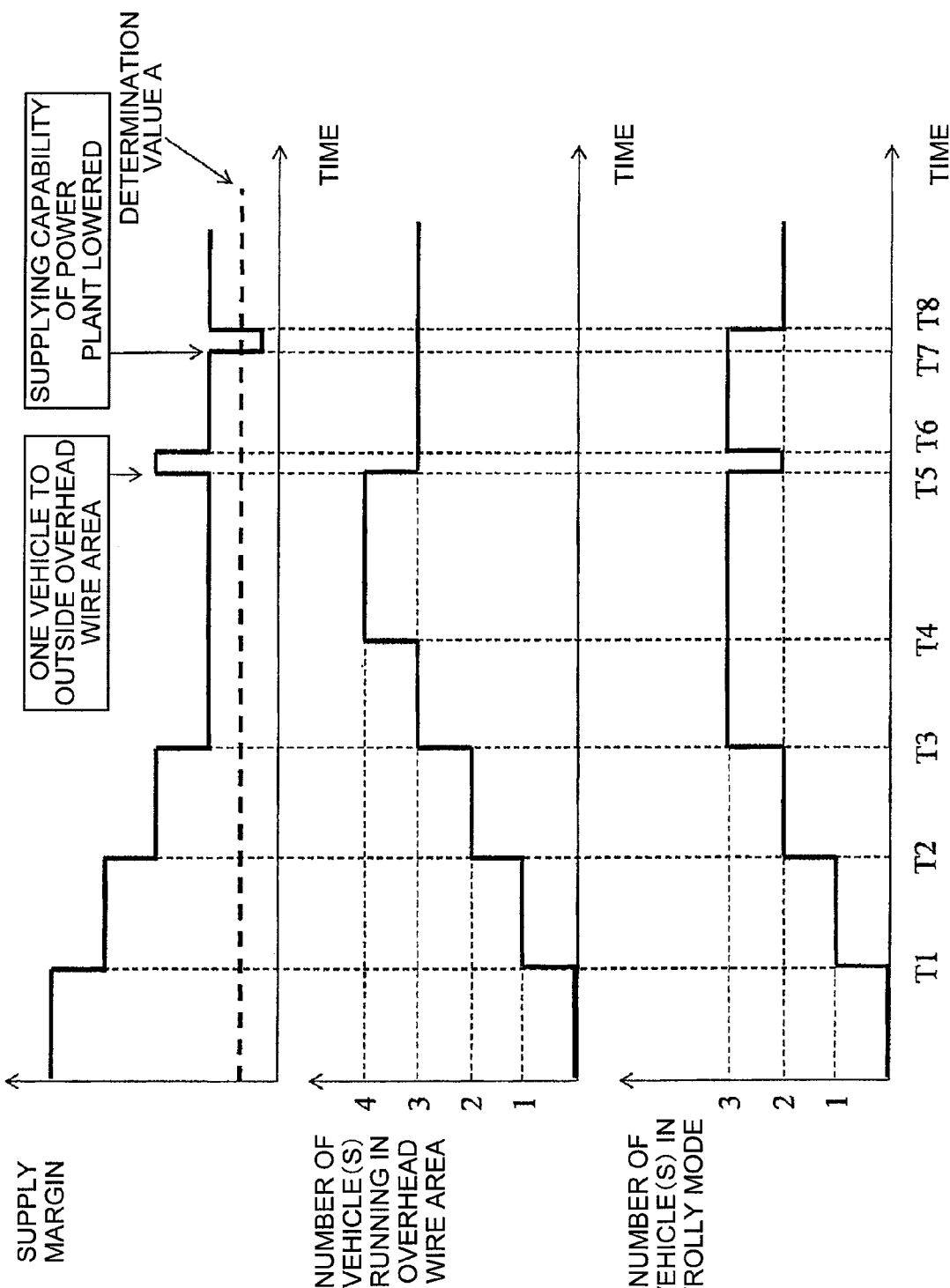
FIG. 6 shows by way of example the management of operation of dump trucks by the operation management system according to the first embodiment.

FIG. 6 shows one example of operation management when the operation of dump trucks is managed by the operation management system according to the first embodiment. Dump trucks enter the overhead wire area one after one at time T1, time T2 and time T3 and are each switched from the diesel mode to the trolley mode, whereby the supply margin of the power plant 20 decreases stepwise. It is to be noted that for the sake of simplification of description, a description of the supply margin of the substation 31 is omitted here. A still further dump truck enters the overhead wire area at time T4. This dump truck, however, continues to run still in the diesel mode in the overhead wire area, because the supply margin would fall below the determination value A if the dump truck were switched from the diesel mode to the trolley mode.

The dump truck, which has been running in the trolley mode in the overhead wire area, runs to outside the overhead wire area at time T5. As the supply margin then increases, the dump truck which has been running in the diesel mode in the overhead wire area is switched to the trolley mode at time T6. When the supply capability of the power plant 20 is lowered at time T7 for a certain cause, the supply margin falls below the determination value A. The dump truck, which is running at the tail out of the dump trucks running in the trolley mode in the overhead wire area, is then switched to the diesel mode at time T8, and the supply margin surpasses the determination value A.

As has been described above, adjustments are made such that the supply margin of the power plant 20 surpasses the determination value A and as many dump trucks as possible run in the trolley mode.

Figure 7:
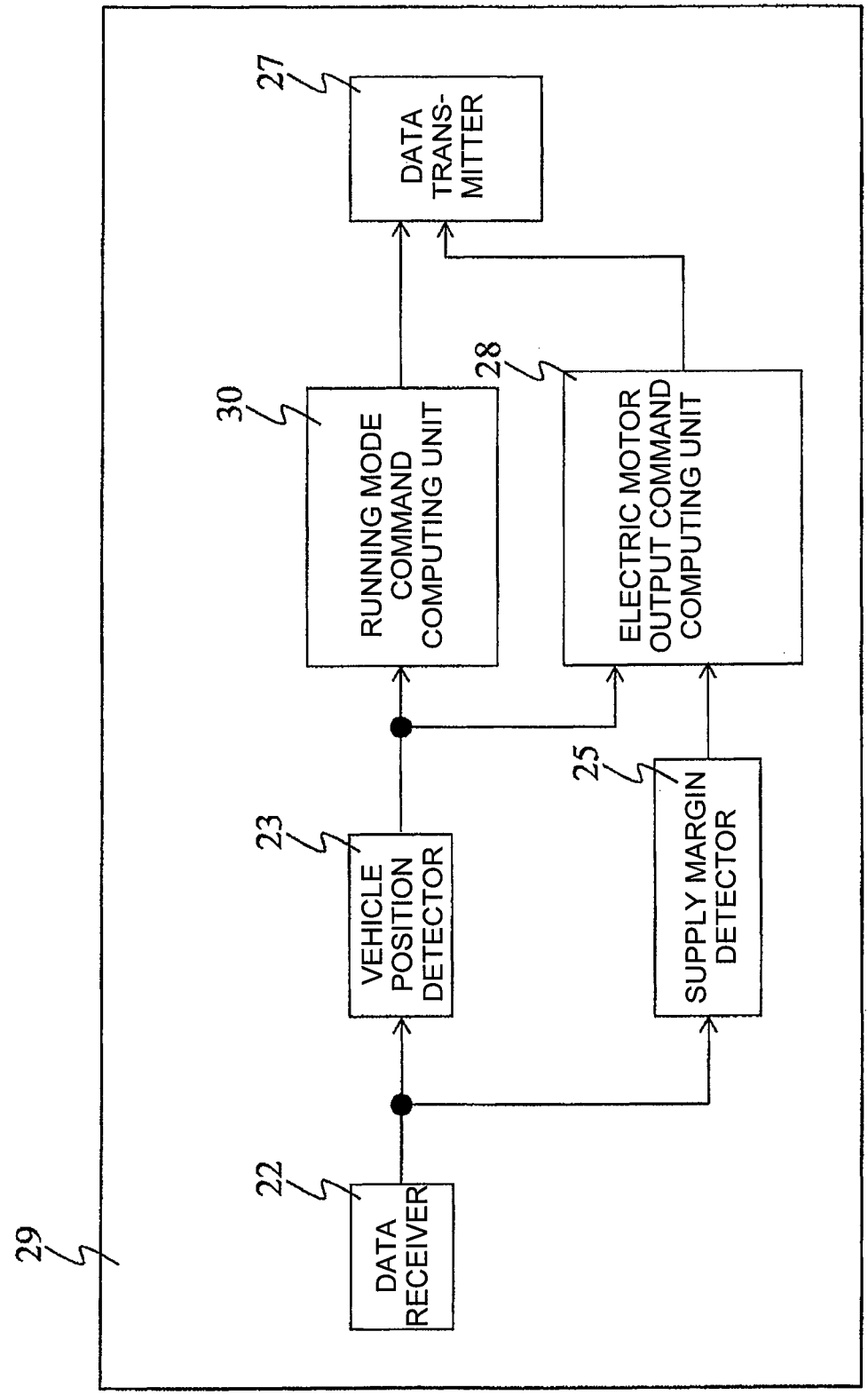
FIG. 7 is a configuration diagram of an operation management system according to a second embodiment of the present invention.

A description will next be made about an operation management system according to a second embodiment. The same parts as in the first embodiment are designated by the same reference numerals, and their description will be omitted. FIG. 7 shows the configuration of the operation management system according to the first embodiment. As shown in FIG. 7, the operation management system according to the second embodiment is provided with the data receiver (data reception unit) 22, the vehicle position detector (vehicle position detecting unit) 23, the supply margin detector (supply margin detection unit) 25, a running mode command computing unit (running mode determination unit) 30, an electric motor output command computing unit (electric motor output determination unit) 28, and the data transmitter (running mode instruction unit and electric motor output instruction unit) 27. This operation control system is installed in a management station 29, receives various data transmitted from the power plant 20, substation 31 and dump trucks 21a-21e to the management station 29 via the communication network 19, and manages the operation of the dump trucks 21a-21e based on these received data. A description will hereinafter be made in detail as to how the management station 29 is managing the operation of the dump trucks.

The data receiver 22 receives, via the communication network 19, first data on the supply margins of the power plant 20 and substation 31, and second data on the running positions of the individual dump trucks. The vehicle position detector 23 detects, from the second data, the running positions of the individual dump trucks. The supply margin detector 25 detects, from the first data, the supply margins of the power plant 20 and substation 31. Using, as inputs, the running positions of the individual dump trucks as outputted from the vehicle position detector 23, the running mode command computing unit 30 outputs running mode commands to the individual dump trucks. Using, as inputs, the running positions of the individual dump trucks as outputted from the vehicle position detector 23 and the supply margins of the power plant 20 and substation 31 as outputted by the supply margin detector 25, the electric motor output command computing unit 28 outputs electric motor output commands (output commands) to the electric motors that drive the wheels of the individual dump trucks. Using, as inputs, the running mode commands outputted from the running mode command computing unit 30 and the electric motor output commands for the individual dump trucks as outputted from the electric motor output command computing unit 28, the data transmitter 27 transmits the running mode commands and electric motor output commands to the individual dump trucks via the communication network 19.

A description will next be made about the procedure of processing by the operation management system according to the second embodiment. It is to be noted that similar to the operation management system according to the first embodiment, the operation management system according to the second embodiment also performs the dump truck operation process at a timing of once every three minutes (see FIG. 4).

Figure 8:
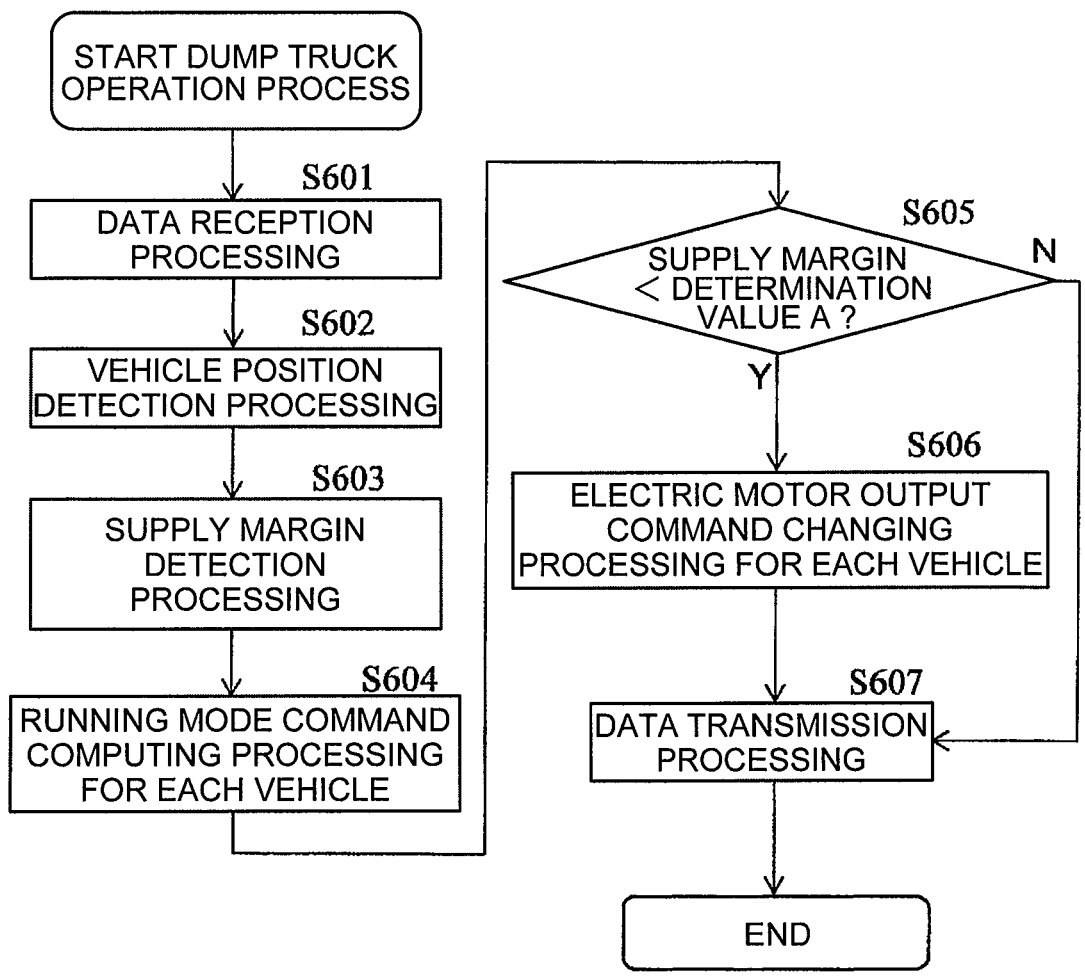
FIG. 8 is a flow chart illustrating the procedure of a dump truck operation process to be executed by the operation management system according to the second embodiment.

A description will next be made about details of the dump truck operation process. FIG. 8 is a flowchart of the operation process of the dump trucks. In S601, the data receiver 22 receives first data on the supply margins of the power plant 20 and substation 31 and second data on the running positions of the individual dump trucks. After execution of S601, the process moves to S602. In S602, the vehicle position detector 23 detects the running positions of the individual dump trucks from the second data. After execution of S602, the process moves to S603. In S603, the supply margin detector 25 detects the supply margins of the power plant 20 and substation 31 from the first data. After execution of S603, the process moves to S604.

In S604, running mode commands for the individual dump trucks are computed from the running positions of the individual dump trucks. Described specifically, a command of running in the trolley mode is computed for each dump truck existing in the overhead wire area, and a command of running in the diesel mode is computed for each dump truck existing in the non-overhead wire area. After execution of S604, the process moves to S605.

In S605, the supply margins of the power plant 20 and substation 31 are compared with the determination value A. If either one of the supply margins is smaller than the determination value A, the process moves to S606, or otherwise moves to S607. It is to be noted that the determination value to be compared with the supply margin of the power plant 20 and the determination value to be compared with the supply margin of the substation 31 may be set individually.

In S606, computation is performed to change the electric motor output command for the electric motor, which drives the wheels of each dump truck running in the trolley mode, such that the supply margins of the power plant 20 and substation 31 become equal to or greater than the determination value A. Here, these electric motor output commands are computed such that the running speed of any aftrunning one of the dump trucks becomes higher in running speed than any forerunning one of the dump trucks. This is to avoid such a situation that the aftrunning dump truck would catch up with and would come close to the forerunning dump truck if the speed of the aftrunning dump truck became higher than the speed of the forerunning dump truck. After execution of S606, the process moves to S607. As an alternative, the electric motor output commands may be computed such that the speeds of all of plural ones of the dump trucks, said plural dump trucks running in the trolley mode, will be equally lowered. In this case, there is an advantage in that the working process at the mine requires no change because the fore-to-aft distances between the running dump trucks are maintained.

In S607, the data transmitter 27 transmits the running mode command and electric motor output command to each dump truck. Upon execution of S607, the series of processing ends.

The determination value A is set in consideration of output variations of the power plant 20 and variations in the power to be consumed by the loads 32. Assuming, for example, that output variations of the power plant 20 are ±10% relative to the rated output of the power plant 20 and variations of the power consumed by the loads 32 are ±10%, the power that can be supplied to the overhead wires 14 may decrease by 20% if, transiently, the output of the power plant 20 decreases by 10% and the power consumed by the loads 32 increases by 10%. Therefore, the determination value A is set, for example, at 20%. By setting as described above, the overhead wires 14 no longer require any power in excess of the supply capability of the power plant 20, thereby making it possible to avoid tripping of the power plant 20.

By adopting such a flow chart as described above, the supply margins of the power plant 20 and substation 31 can be maintained equal to or greater than the determination value A. As a consequence, it is possible to avoid tripping of the power plant 20 and/or substation 31, and hence, to avoid lowering of the operating rates of the dump trucks. As the number of dump trucks running in the trolley mode increases to an extent that the supply margins of the power plant 20 and substation 31 remain equal to or greater than the determination value A, it is possible to assure an increase in the transport volume of ores and a reduction in fuel consumption.

Figure 9:
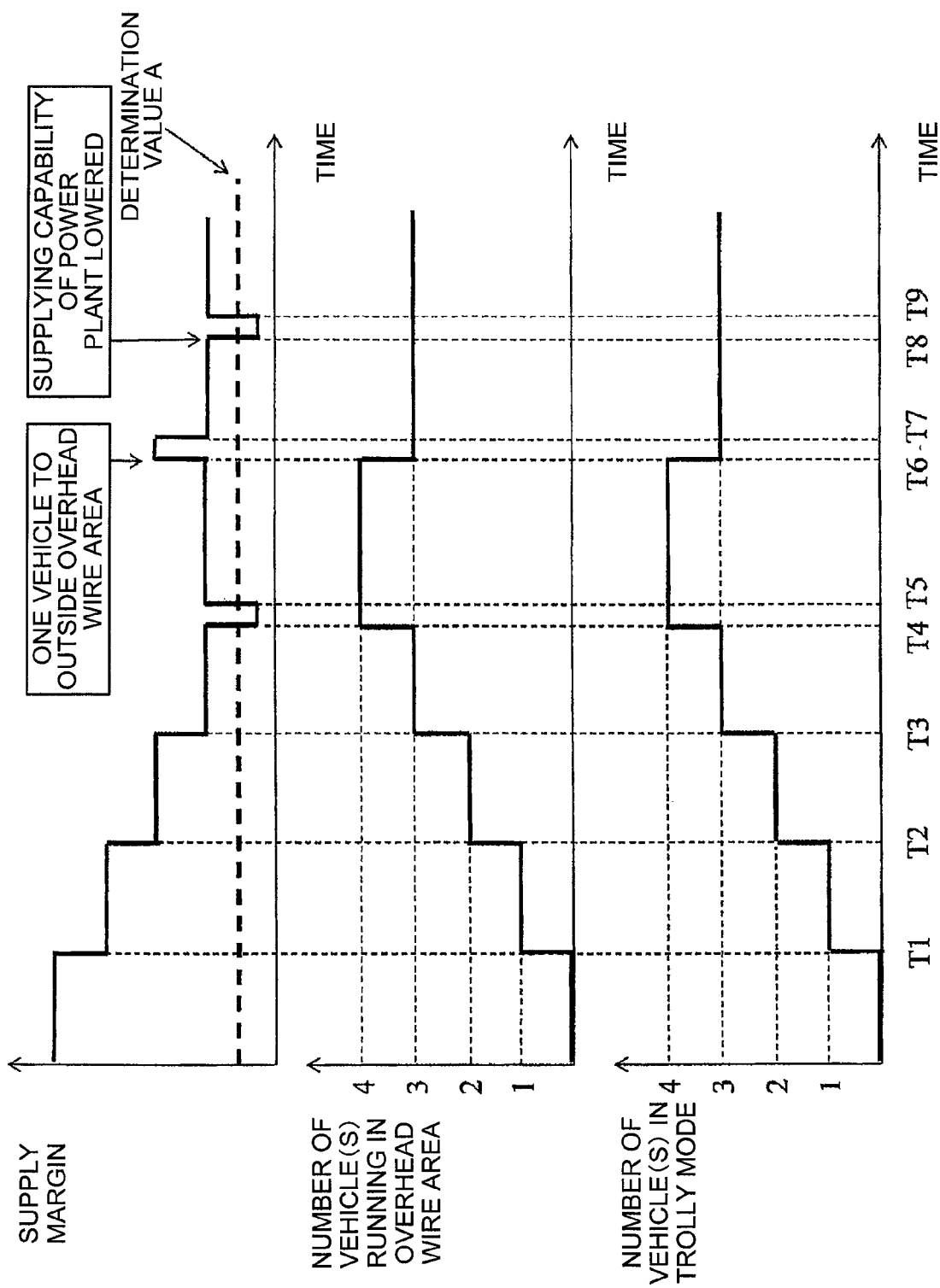
FIG. 9 shows by way of example the management of operation of dump trucks by the operation management system according to the second embodiment.

FIG. 9 shows one example of operation management when the operation of dump trucks is managed by the operation management system according to the second embodiment. Dump trucks enter the overhead wire area one after one at time T1, time T2 and time T3 and are each switched from the diesel mode to the trolley mode, whereby the supply margin of the power plant 20 decreases stepwise. It is to be noted that for the sake of simplification of description, a description of the supply margin of the substation 31 is omitted here. A still further dump truck enters the overhead wire area at time T4 and is switched from the diesel mode to the trolley mode, whereby the supply margin falls below the determination value A. The electric motor output command for the electric motor, which drives the wheels of the dump truck running in the trolley mode in the overhead wire area, is then decreased so that the supply margin surpasses the determination value A at time T5.

The dump truck, which has been running in the trolley mode in the overhead wire area, runs to outside the overhead wire area at time T6. As the supply margin then increases, the electric motor output command for the electric motor, which drives the wheels of the dump truck running in the trolley mode in the overhead wire area, is restored, whereby the supply margin decreases at time T7 to an extent that still surpasses the determination value A. When the supply capability of the power plant 20 is lowered at time T8 for a certain cause, the supply margin falls below the determination value A. The electric motor output command for the electric motor, which drives the wheels of the dump truck running in the trolley mode in the overhead wire area, is then decreased, whereby the supply margin surpasses the determination value A at time T9.

As has been described above, adjustments are made such that the electric motor output command for the electric motor, which drives the wheels of the dump truck running in the trolley mode, is adjusted such that the supply margin of the power plant 20 surpasses the determination value A, and adjustments are made such that as many dump trucks as possible run in the trolley mode.

It is to be noted that in the foregoing, the supply margins of the power plant 20 and substation 31 were assured to become equal to or greater than the predetermined value A in the computation of the running mode command for each dump truck and the computation of the electric motor output command for the electric motor that drives the wheels. However, there is also a limitation to the power or current that can be passed through the overhead wires 14. By detecting, as the supply margin of the overhead wires 14, how much power or current the overhead wires 14 can supply further, the supply margins of the power plant 20, substation 31 and overhead wires 14 may be assured to become equal to or greater than the predetermined determination value A. Further, the determination value to be compared with the supply margin of the power plant 20, the determination value to be compared with the supply margin of the substation 31 and the determination value to be measured with the supply margin of the overhead wire 14 may be set individually.

LEGENDS

1: diesel engine (engine), 2: generator, 3: rectifier, 4: inverter, 5: inverter, 6: electric motor, 7: electric motor, 8: reduction gear, 9: reduction gear, 10: wheel, 11: wheel, 12: chopper, 13: regenerative resistor, 14: overhead wires, 15: pantographs, 16: magnetic connector, 17: reactor, 18: management station, 19: communication network, 20: power plant, 21a-21e: dump trucks (electric drive vehicles), 22: data receiver (data reception unit), 23: vehicle position detector (running position detecting unit), 24: running mode detector (running mode detection unit), 25: power supply margin detector supply margin detection unit), 26: running mode command computing unit (running mode determination unit), 27: data transmitter (running mode instruction unit, electric motor output instruction unit), 28: motor output command computing unit (motor output determination unit), 29: management station, 30: running mode command computing unit (running mode determination unit), 31: substation, 32: loads.

The invention claimed is:

1. An operation management system for managing operation of a plurality of electric drive vehicles, each of which is provided with two running modes including a trolley mode in which the respective one of the electric drive vehicles runs by power supplied by overhead wires from a power plant or a substation and a diesel mode in which the respective one of the electric drive vehicles runs by power obtained from a generator driven by a diesel engine, the operation management system being installed in a management station and connected to communicate with the electric drive vehicles via a communication network, the operation management system comprising:

a data reception unit for receiving first data on a supply margin of power as transmitted from at least one of the power plant and the substation, second data on respective running positions as transmitted from each of the electric drive vehicles over the network, and third data of the respective running modes as transmitted from each of the electric drive vehicles over the network;

a supply margin detection unit for detecting a current supply margin based on the first data;

a running position detecting unit for detecting current running positions of the respective electric drive vehicles based on the second data;

a running mode detection unit for detecting current running modes of the respective electric drive vehicles based on the third data;

a running mode determination unit for determining next running modes of the respective electric drive vehicles based on detection results by the supply margin detection unit, running position detecting unit, and running mode detection unit; and a running mode instruction unit for instructing the next running modes, which have been determined by the running mode determination unit, to the respective electric drive vehicles over the network, wherein when the respective running positions of said electric drive vehicles are in an area of the overhead wires and the respective running modes of said plural electric drive vehicles are the same, the running mode instruction unit instructs, based on the respective running positions as detected by the running position detection unit, to switch the respective running modes in turn from one of the electric drive vehicles running at a head or a tail of the electric drive vehicles.

2. The operation management system according to claim 1, wherein, when the supply margin as detected by the supply margin detection unit is not smaller than a predetermined value, the respective running positions of the electric drive vehicles as detected by the running position detection unit are in the area of the overhead wires and the respective running modes as detected by the running mode detection unit of each of said plural electric drive vehicles are the diesel mode, the running mode determination unit determines the trolley mode as the next running mode of the one of the electric drive vehicles running at the head of the electric drive vehicles, and the running mode instruction unit instructs the electric drive vehicles to switch to the trolley mode in turn from the one of the electric drive vehicles running at the head of the electric drive vehicles.

3. The operation management system according to claim 1, wherein, when the supply margin as detected by the supply margin detection unit is smaller than a predetermined value, the respective running positions of the electric drive vehicles as detected by the running position detection unit are in the area of the overhead wires and the respective running modes as detected by the running mode detection unit of each of said plural electric drive vehicles are the trolley mode, the running mode determination unit determines the diesel mode as the next running mode of the one of the electric drive vehicles running at the tail of the electric drive vehicles, and the running mode instruction unit instructs the electric drive vehicles to switch to the diesel mode in turn from the one of the electric drive vehicles running at the tail of the electric drive vehicles.

4. The operation management system according to claim 1, wherein, when the supply margin as detected by the supply margin detection unit is smaller than a predetermined value and the respective running positions of the electric drive vehicles as detected by the running position detection unit includes that another one of the electric drive vehicles enters the area of the overhead wires, the running mode determination unit determines the diesel mode as the next running mode of the other one of the electric drive vehicles, and the running mode instruction unit instructs the other one of the electric drive vehicles to switch to the diesel mode.

* * * * *